United States Patent [19]

Miller et al.

[11] Patent Number: 5,489,617
[45] Date of Patent: Feb. 6, 1996

[54] HIGH VISCOSITY SURFACTANTS FOR THE MANUFACTURE OF POLYURETHANE FOAMS

[75] Inventors: Glenn A. Miller, Charleston; David L. Kirchner, S. Charleston; Susan B. McVey, Charleston, all of W. Va.

[73] Assignee: OSi Specialties, Inc., Danbury, Conn.

[21] Appl. No.: 436,788

[22] Filed: May 8, 1995

Related U.S. Application Data

[63] Continuation of Ser. No. 340,980, Nov. 17, 1994, abandoned.

[51] Int. Cl.$^6$ ............................................. C08J 9/02
[52] U.S. Cl. .................................................. 521/112
[58] Field of Search ............................................. 521/112

[56] References Cited

U.S. PATENT DOCUMENTS

| | | |
|---|---|---|
| 4,147,847 | 4/1979 | Schweiger . |
| 4,855,329 | 8/1989 | Blevins, II et al. . |
| 5,145,879 | 9/1992 | Budnick et al. . |

FOREIGN PATENT DOCUMENTS 4239054  5/1994  Germany .

*Primary Examiner*—Morton Foelak
*Attorney, Agent, or Firm*—Andrew Reiskind

[57] ABSTRACT

The present invention discloses high viscosity surfactants which may be used, when diluted to a viscosity below 2500 cP at 25° C., as surfactants for the production of polyuretahne foam. Specifically, the surfactants of the present invention have the generalized average formula $M^*D_xD''_yM^*$ wherein $M^*$ is $(CH_3)_3SiO_{1/2}$ or $R(CH_3)_2SiO_{1/2}$;

$M''$ is $R(CH_3)_2SiO_{1/2}$;

$D$ is $(CH_3)_2SIO_{2/2}$;

$D''$ is $(CH_3)(R)SiO_{2/2}$;

x is 81–220, y is 8–40 and $D/(D''+M'')\leq10$;

R is a polyether-containing substituent derived from a blend of $C_nH_{2n}$-started polyethers selected from two different groups such that the average molecular mass is 1100–1800.

9 Claims, No Drawings

HIGH VISCOSITY SURFACTANTS FOR THE MANUFACTURE OF POLYURETHANE FOAMS

The present application is a continuation of application Ser. No. 08/340,980 filed Nov. 17, 1994, now abandoned.

BACKGROUND OF THE INVENTION

In polyurethane foam manufacturing surfactants are needed to stabilize the foam until the product-forming chemical reaction is sufficiently complete so that the foam supports itself and does not suffer objectionable collapse. High potency surfactants, generally understood to be those which give a high height of rise and little top collapse, are desirable because foams which collapse to a substantial degree before setting have high densities and objectionable density gradients.

However, surfactants are relatively expensive. Accordingly, foam manufacturers prefer to use as little as possible, employing only as much as required for desired performance. Manufacturers also desire that the properties of the final product be relatively constant as a function of the amount of surfactant used, so that surfactant levels can be varied in the manufacturing process to give good processing, without greatly affecting the properties of the product.

Silicone surfactants for polyurethane foam manufacture typically are materials having siloxane backbones and polyether pendant groups. They are of two types, nonhydrolyzable and hydrolyzable. The nonhydrolyzable surfactants, in which the polyether pendant groups are attached to the siloxane backbone by Si—C bonds, are generally believed to have high potency, but to produce "tight" foams with poor (low) breathability. Hydrolyzable surfactants, in which the polyether pendant groups are attached to the siloxane backbone by hydrolytically unstable Si—O bonds, are generally believed to have poor potency, but to offer good processing characteristics, and to produce foams with good (high) breathability.

Some investigators have questioned such generalizations and have attempted to develop silicone surfactants that have high potency, provide good processing characteristics, and produce foams having good breathability, by varying the structure of the surfactant appropriately. Examples of such materials are described in U.S. Pat. No. 4,147,847 which describes certain siloxane-oxyalkylene copolymer silicone surfactants having ratios of $(CH_3)_2SiO_{2/2}$ units to $(CH_3)(R)SiO_{2/2}$ units in the range of 3.5:1 to 15:1, for use in flame retardant polyurethane compositions. Another example is given in U.S. Pat. No. 5,145,879 which describes nonhydrolyzable silicone surfactants which have high potency, offer good processing characteristics, produce foams having good breathability, and which function well in flame retardant formulations. However, these formulations, unfortunately, require ancillary blowing agents, such as methylene chloride, to generate the desired foam density.

Most ancillary blowing agents have been found to contribute to the depletion of the ozone layer or air pollution and are being heavily regulated by legislatures. These ancillary blowing agents are becoming increasingly restricted due to concerns for ozone layer depletion, air pollution, worker exposure, and other health, safety and environmental issues.

The use of additional water (to react with the isocyanate to generate excess $CO_2$) has been gaining popularity as the primary means to blow the foam. These systems are highly stressed and require surfactants that insure compatibility of the components with the higher levels of water as well as the desired foam performance features described above.

One type of surfactant that was found to work well in such situations is that described in U.S. Pat. No. 5,145,879. However, the teachings therein are limited to a narrow range of silicone architecture and are limited in molecular weights. This is believed to have been limited by the difficulty in handling the increased viscosity of higher molecular weight silicones. More importantly, the silicone surfactants described therein exhibited problems with foam performance, yielding coarse cells and/or center splits, despite being better than most surfactants at the high levels of water required in all-water blown foam systems.

SUMMARY OF THE INVENTION

The present invention provides nonhydrolyzable silicone surfactants for use in manufacturing all water blown polyurethane foam, all water blown polyurethane foams made using said surfactants and methods of making such compositions. The surfactants disclosed herein offer good potency and desirable processing characteristics in that they offer generally flat breathability profiles as the surfactant level is varied in the polyurethane foams produced with them. They are particularly useful in flame retardant polyurethane conventional flex foam compositions.

DETAILED DESCRIPTION OF THE INVENTION

This invention relates to silicone surfactants, and more particularly to silicone surfactants having a siloxane backbone and oxyalkylene oxide pendant groups of both high and low molecular masses, which surfactants provide a combination of good potency and good processing latitude in urethane foam production without or with substantially reduced levels of ancillary blowing agents.

The new all water or reduced blowing agent ("aw/rba") blown polyurethane foam formulations employ the reaction of water with isocyanates to give carbon dioxide ($CO_2$) as the sole or primary source of gas to blow the foam. These formulations require increased amounts of water compared to conventional foam formulations which must be compatabilized into the polyol and isocyanate phases. In addition, some of the blowing agents, such as methylene chloride, helped to compatibilize the foam components and reduce viscosity. Since the water-isocyanate reaction is very exothermic, and without the auxiliary blowing agent to absorb some of this heat by evaporation, the foam system temperature profiles can be quite different and more extreme. The surfactants of the present invention mitigate all of these new problems.

With proper cooling capability, such as the mechanical cooling as described in U.S. Pat. No. 3,890,414 and the co-pending U.S. patent application Ser. No. 08/101,189, the usage of isocyanate can be lowered with the present invention. This results in a substantial value cost savings to foam manufacturers, as well as reduced emissions to the environment. The present invention when used in aw/rba blown, reduced index formulation clearly demonstrates its advantage in these new formulations.

SURFACTANT COMPOSITION

The present invention includes silicone surfactants for use in forming aw/rba blown polyurethane foam, polyurethane foam compositions incorporating same, and a method for forming aw/rba blown polyurethane foam using said surfactants. The silicone surfactants taught for use herein are of generally a high molecular weight, having a number average molecular weight in excess of 9,000. In addition, the silicone-polyoxyalkylene oxide copolymer is composed of two types of polyethers.

The range of silicone architecture can be extended to much higher silicone molecular weights provided the final surfactant mixture viscosity is less than 2500 cP. It is hypothesized that the higher molecular weight copolymers previously tested were not successful (see U.S. Pat. No. 5,145,879) because these high viscosity materials (some above 12,000 cP at 25° C.) did not disperse well in foams, thus giving poor performance. The key to solving this problem, as discovered in the present invention, is that it is necessary to dilute the high viscosity high molecular weight surfactants before adding them to the foam matrix.

High viscosity copolymers have shown unpredictable and/or non-reproducible results, presumably due to the difficulty in dispersing the copolymer in the foam matrix in the first few seconds allowed in the foaming process. Since the early stages of the foaming process are critical in the dispersion of the chemicals and the nucleation of bubbles, the inability of the viscous surfactants to disperse and dissolve leads to non-reproducible performance. When surfactant viscosities get above 2500 cP, unpredicted performance is often observed in the polyurethane foam made therewith, especially at lower usage levels (the preferred usage level). Very steep airflow slopes, an undesirable feature described below, have been the most common symptom observed with high viscosity surfactants. Poor rise performance or foam defects (splits, voids) also are observed more frequently with undiluted high viscosity surfactants. The present inventors discovered that the dilution of the surfactant avoided these problems. In fact, dilution is necessary for good performance of high viscosity surfactants (due to a high number of siloxy units/chain).

In contrast to the teachings of U.S. Pat. No. 5,145,879, which because of this problem the sum of D+D' was limited to products whose materials have viscosities of less than 2500 cP at 25° C., the present invention allows for long silicone backbones of greater and copolymer viscosities greater than 2500 cP, so long as the copolymers are diluted prior to application in the foam. This dilution presumably facilitates their dispersion during the foaming process and thus yields consistent and reproducible performance results. Thus, the surfactants of the present invention should be diluted so that the resulting mixtures have viscosities of less than about 2500 cP at 25° C.

Excellent performance can be achieved with the surfactants of the present invention as long as the ratio of $(CH_3)_2SiO_{2/2}$ units to $(CH_3)(R)SiO_{2/2}$ units are within a relatively narrow range. Specifically, the surfactants of the present invention have the generalized average formula $M^*D_xD''_yM^*$ wherein $M^*$ is $(CH_3)_3SiO_{1/2}$ or $R(CH_3)_2SiO_{1/2}$;

$M''$ is $R(CH_3)_2SiO_{1/2}$;

$D$ is $(CH_3)_2SiO_{2/2}$;

$D''$ is $(CH_3)(R)SiO_{2/2}$;

x is 81–220, y is 8–40 and $D/(D''+M'') \leq 10$;

R is a polyether-containing substituent derived from a blend of $C_nH_{2n}$-started polyethers selected from the following two groups:

1) $-C_nH_{2n}O(C_2H_4O)_a(C_3H_6O)_bR''$ moieties having average molecular masses in the range 1400–6000, and wherein:

n is 2–10;

a is a number such that ethylene oxide residues constitute greater than or equal to 30%, but less than or equal to 50%, by weight of the alkylene oxide residues of the polyether;

b is a number such that propylene oxide residues constitute less than or equal to 70%, but greater than 50% by weight, of the alkylene oxide residues of the polyether;

R'' represents —H, an alkyl group of 1–4 carbon atoms, —C(O)R''', —C(O)OR''' or —C(O)NHR'''; and R''' represents mono-functional alkyl or aryl groups; and 2) $-C_{n'}H_{2n'}O(C_2H_4O)_{a'}(C_3H_6O)_{b'}R''$ moieties having average molecular masses in the range 300–750, and wherein:

n' is 2–10;

a' is 30 to a number such that ethylene oxide residues constitute 30% to 100% by weight of the alkylene oxide residues of the polyether; and b' is 0 to a number such that propylene oxide residues constitute less than or equal to 70% by weight of the alkylene oxide residues of the polyether; with the requirement that at least one of a' and b' must be finite; and R'' is as defined above.

Said R groups may be the same or different than each other and each of the above polyethers (1) or (2) may be single polyethers or blends of two or more polyethers, each of which fall within the description of the respective group. However, the selection of the R groups and the relative amounts of the polyether chosen from each (1) or (2) must be such that the the overall average molecular mass of the total of (1) and (2) is 1100–1800.

Within the range of compounds of the invention as defined above are a number of preferred materials. The preferred material has the general average formula $M^*D_{81-145}D''_{8-23}M^*$ with the D:(D''+M'') ratio less than or equal to 10:1. A more preferred material within this class has the general average formula $M^*D_{85-135}D''_{8-22}M^*$ with the D:(D''+M'') ratio less than 10:1.

The first group of polyethers (having average molecular masses in the range 1500–6000 or higher) are preferably $-C_3H_6O(C_2H_4O)_a(C_3H_6O)_bR''$ moieties containing approximately 40% by weight of ethylene oxide residues. It is preferred that such moieties have average molecular masses greater than 3500 and especially preferably greater than 4000. A second preferred polyether moiety is a blend of the above preferred polyether with $-C_3H_6O(C_2H_4O)_a(C_3H_6O)_bR''$ moieties containing approximately 40% by weight of ethylene oxide residues and having average molecular masses of approximately 1500 to give a blend with an overall blend average molecular weight of 2000–2400. R'' is preferably —C(O)CH_3 or —CH_3.

The second group of polyethers (defined as having average molecular masses in the range 300–750) are preferably $-C_3H_6O(C_2H_4O)_a(C_3H_6O)_bR''$ moieties containing little ($\leq 20$ w/w %) or no propylene oxide residues and having average molecular masses in the range 300–750. A second preferred polyether moiety is composed of $-C_3H_6O(C_2H_4O)_a(C_3H_6O)_bR''$ moieties containing approximately 40% by weight of ethylene oxide residues and having average molecular masses in the range 400–600. In these low molecular mass materials, R'' is preferably —C(O)CH_3 or CH_3.

Procedures for synthesizing nonhydrolyzable silicone surfactants having polyalkylene oxide pendant groups are well known in the art. Representative disclosures are provided in U.S. Pat. Nos. 4,147,847 and 4,855,379, relevant portions of which are hereby incorporated by reference.

Typically, the surfactants of the invention are prepared by causing a polyhydridosiloxane of generalized average formula $M^{}D_xD'_yM^{}$ to react with an appropriately chosen blend of allyl-started oxyalkylene polymers in the presence of a hydrosilation catalyst such as hexachloroplatinic acid. In the formula for the polyhydridosiloxane, $M^{**}$ is $(CH_3)_2(H)SiO_{1/2}$ or $(CH_3)_3SiO_{1/2}$, D is as defined above, and D' represents $(CH_3)(H)SiO_{2/2}$. The allyl-started oxyalkylene polymers are polyethers having a terminal vinyl group, which may optionally be 2-substituted, and containing multiple units derived from ethylene oxide, propylene oxide, or both. The reagents are mixed, optionally in a solvent such as toluene or dipropylene glycol (DPG), heated to about 70°–90° C., then the catalyst is added, a temperature rise of about 10°–15° C. is observed, and the mixture is finally sampled and analyzed for SiH groups (by adding an aliquot to alcoholic KOH and measuring evolved hydrogen). If a volatile solvent was used, this is removed under vacuum, and the mixture is generally neutralized with a weak base such as $NaHCO_3$, then filtered.

The polyhydridosiloxanes of generalized average formula $M^{}D_xD'_yM^{}$ are prepared in the manner known to the art. For the case in which $M^{}$ is $(CH_3)_3SiO_{1/2}$, an alkyldisiloxane such as hexamethyldisiloxane, a polyhydridosiloxane polymer, and an alkyl cyclosiloxane such as octamethylcyclotetrasiloxane are reacted in the presence of a strong acid such as sulfuric acid. For the case in which $M^{}$ is $(H)(CH_3)_2SiO_{2/2}$, a hydridoalkyldisiloxane such as dihydridotetramethyldisiloxane, a polyhydridosiloxane polymer, and an alkyl cyclosiloxane such as octamethylcyclotetrasiloxane are reacted in the presence of a strong acid such as sulfuric acid.

The allyl-started oxyalkylene polymers, also referred to as polyethers, are likewise prepared in the manner known to the art. An allyl alcohol, optionally bearing a substituent on the 1- or 2- position, is combined with ethylene oxide, propylene oxide, or both, in the presence of a Lewis acid or a base, to yield the desired polyether with a terminal hydroxyl group. The epoxides may be block-fed or randomly distributed along the polyether chain. The resulting polyether is typically capped by further reaction with an alkylating or acylating agent such as a methyl halide, or acetic anhydride. Other end caps may be employed, such as phenyl isocyanate.

POLYURETHANE COMPOSITION

The present invention also relates to aw/rba blown polyurethane foam compositions comprising:

(a) a polyether polyol containing an average of more than two hydroxyl groups per molecule;

(b) an organic diisocyanate;

(c) at least one catalyst for production of polyurethane foam;

(d) water;

(e) a siloxane-oxyalkylene copolymer surfactant as defined above;

(f) diluent; and (g) optionally, a reduced amount of blowing agent.

Specifically, the surfactants of the present invention as previously disclosed herein are employed in the manufacture of polyurethane foam in the manner known to the art. In producing the polyurethane foams using the surfactants of this invention, one or more polyether polyols is employed for reaction with a polyisocyanate reactant to provide the urethane linkage. Such polyols have an average of at least slightly above 2 and typically 2.1 to 3.5 hydroxyl groups per molecule. The polyols typically also include compounds which consist of carbon, hydrogen, and oxygen, and compounds which may also contain phosphorus, halogen, and/or nitrogen. Such polyether polyols are well known in the art and are commercially available.

The organic polyisocyanates that are useful in producing polyether polyurethane foams in accordance with the teachings of this invention are also well known in the art, and are organic compounds that contain at least two isocyanate groups. Any such compounds or mixtures thereof can be employed, e.g., methylene diphenyl diisocyanate (MDI). The toluene diisocyanates (TDI) are among many suitable isocyanates which are commercially used in the preparation of polyurethane foams. The isocyanate index is typically 60 to 130.

The urethane foaming reaction is usually effected in the presence of a minor amount (0.0001 to 5 weight percent (wt. %)) of a catalyst, preferably an amine catalyst and usually a amine such as triethylene diamine, 3-dimethylamino-N,N-dimethylpropionamide, tetraethylenediamine (TEDA), and/or bis (2,2'-dimethylaminoethyl) ether.

It is also preferred to include a minor amount (0.0001 to 5 wt. %) of certain metal catalysts in addition to the amine catalyst in the components of the reaction mixture. Such supplementary catalysts are well known to the art of polyether-based polyurethane foam manufacture. For example, useful metal catalysts include organic derivatives of tin, particularly tin compounds of octanoic acid.

Blowing agents such as water are typically employed to generate carbon dioxide in situ. Ancillary blowing agents which are vaporized by the exotherm of the reaction have been used in the past and may be used herein, but, unless otherwise indicated, no ancillary blowing agents are necessary to utilize the surfactants of the present invention. Most of the blow in the foam formed herein preferably will be the result of the reaction of added water with isocyanate because the ozone depleting or VOC reagents are not required herein.

Other additives may be added to the polyurethane foam to impart specific properties to the foam, including, but not limited to, coloring agents, flame retardants, and GEO-LITE® Modifier 205 foam additive (available from OSi Specialties, Inc. of Danbury, Conn.).

The surfactants should be of the type mentioned above and should be present at 0.001 to 8 wt. % of the total reaction mixture, preferably 0.2 to 1.5 wt. %.

The types of diluents used to dilute the surfactants of the present invention are relatively unimportant. The key characteristics include lowering the blend viscosity below 2500 cP at 25° C. and having good solubility characteristics with the siloxane-polyoxyalkylene oxide copolymer. Low volatility, low flammability, low toxicity, and low cost are additionally desirable features in the diluent. Common diluents include dipropylene glycol (DPG), low molecular weight polyethers, ethoxylated phenols, and alkylated benzene. In fact, the polyol used in the foam may be used as a diluent, however, such dilution must take place prior to mixing the foam composition. The amount of diluent depends on the amount of surfactant used, solubility of copolymer in the diluent, and the amount needed to effect the desired viscosity reduction.

The polyurethanes produced in accordance with the present invention can be used in the same fields as conventional polyether polyurethanes. For example, the foams of the present invention can be used with advantage in the manufacture of textile interliners, cushions, mattresses, padding, carpet underlay, packaging, gaskets, sealers, thermal insulators and the like. They are most advantageously used in flame retardant applications.

PROCESS OF MAKING POLYURETHANE FOAM

The present invention further relates to a method of preparing a aw/rba blown polyurethane foam by the steps of:

1) preparing a mixture comprising:
   (a) a siloxane-oxyalkylene copolymer surfactant as defined above; and
   (b) a diluent in an amount sufficient to reduce the viscosity of the mixture to less than 3,000 cP at 25° C.;
2) preparing a mixture comprising:
   (a) a polyether polyol containing an average of more than two hydroxyl groups per molecule;
   (b) an organic diisocyanate;
   (c) at least one catalyst for production of polyurethane foam;
   (d) water;
   (e) the mixture made in step (1); and
   (f) optionally, reduced or no blowing agent.
2) allowing the mixture made in step (2) to foam; and
3) curing the foamed composition.

Specifically, the polyether-based polyurethane foams of this invention may be formed in accordance with any of the processing techniques known to the art, such as, in particular, the "one shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the polyether, polyol, and catalyst components.

It is to be understood that the relative amounts of the various components of the foam formulation are not narrowly critical. The polyether polyol and polyisocyanate are present in the foam-producing formulation in a major amount. The relative amounts of these two components in the mixture are well known to the art. The blowing agent, catalyst, and surfactant are each present in a minor amount sufficient to foam the reaction mixture. The catalyst is present in a catalytic amount, i.e., that amount necessary to catalyze the reactions to produce the urethane at a reasonable rate, and the surfactant is present in an amount sufficient to impart the properties desired.

In a typical preparation, the polyether polyol, surfactant, amine catalyst, and blowing agent are mixed together, then stannous octoate is added with stirring, and finally toluene diisocyanate is mixed in and the composition is allowed to foam and polymerize.

EXAMPLES

In the examples which follow, all reactions involving the manipulation of organometallic compounds were performed in an inert atmosphere. Commercial reagents were used without additional purification.

DEFINITIONS AND IDENTIFICATIONS OF MATERIALS

The following terms are employed herein as defined below. Various materials are also defined below for the convenience of the reader.

The term potency refers to the ability of a surfactant to stabilize foam during its manufacture. High potency surfactants allow high heights of rise and only relatively small amounts of top collapse during foam manufacture (with relatively low use levels of surfactant).

The phrase "processing latitude" refers to the ability of a polyurethane foam composition to tolerate changes in its ingredients or amounts thereof, while still producing foam having the desired properties.

The terms breathability and airflow refers to the ability of a cured foam to permit passage of a gas, such as air, through the foam. A "tight" foam has low breathability, while an "open" foam is said to have a high breathability and permits ready passage of gas through it.

"Flat breathability" refers to the property of a surfactant to function in foam compositions at various levels while still producing product foams having relatively constant breathabilities. A surfactant with a "steep breathability (or airflow) slope" has the undesirable feature that the breathability changes dramatically with surfactant or tin use levels.

Blend average molecular weight (BAMW) is the weighted average molecular weight of the mixture of polyethers, the weighting taking account of the relative amounts of materials in the mixture. The blend average molecular weight is the overall average molecular mass of the polyethers constituting the mixture.

ARCO® Polyol 16–56 is a proprietary commercial product of ARCO Chemical Co. of New Town Square, Pa. and has the Chemical Abstracts Registry Number 9082-00-2.

Polycat-77 amine catalyst is a tertiary amine trimerization catalyst available from Air Products Co. of Allentown, Pa.

In accordance with generally-accepted usage, the following symbols are defined as shown:

M is $(CH_3)_3SiO_{1/2}$;

M" is $(H)(CH_3)_2SiO_{1/2}$;

M" is $(R)(CH_3)_2SiO_{1/2}$ where R is a polyether-containing group;

D is $(CH_3)_2SiO_{2/2}$;

D' is $(H)(CH_3)SiO_{2/2}$; and

D" is $R(CH_3)SiO_{2/2}$; where R is a polyether-containing group.

T is $(CH_3)SiO_{3/2}$;

L-31 is a polyhydridosiloxane polymer having the general formula $MD'_{45-60}M$.

NIAX® catalyst A-1 is a tertiary amine which is commercially available from OSi Specialties, Inc. The components of the mixture have the Chemical Abstracts Registry Numbers 3033-62-3 and 110-98-5.

NIAX® Catalyst C-183 is a tertiary amine and a glycol mixture commercially available from OSi Specialties, Inc.

THERMOLIN™ 101 is a chlorinated phosphate ester product of the Olin Chemical Company of Stanford, Conn., and has the structure tetrakis(2-chloroethyl)ethylene diphosphate. Its Chemical Abstracts Registry Number is 33125-86-9.

Toluene diisocyanate (TDI) used herein is a mixture of approximately 80% of the 2,4- isomer and 20% of the 2,6-isomer.

The compounds designated as UCC&P I, II, III, IV, and V are polyalkyleneoxidemethylsiloxane copolymers commercially available from OSi Specialties Inc. under the following trade names: UCC&P I is L-620, UCC&P II is RS-210, UCC&P III is L-550, UCC&P IV is L-580, UCC&P V is L-5810. These materials have the general structures described in U.S. Patent Nos. 3,980,688, 4,857,583, and 5,145,879 of $MD_xD''_yM$ wherein x is between 60–80 and y is between 4–10.

UCC&P VI, a hydrolyzable polyalkylene-oxidemethylsiloxane copolymer commercially available from by OSi Specialties Inc. under the trade name SC-176, is based on an architecture of the type $T(DD'')_3$ as described in U.S. Pat. No. 3,980,688.

Compound A is DC-5160, a proprietary commercial silicone surfactant available from the Dow Corning Chemical Company of Midland, Minn. (marketed by Air Products). It was used for comparison purposes.

Compounds B–D are commercial hydrolyzable, alkoxy end-blocked non-flame retardant silicon surfactants available from the Th. Goldschmidt Company of Essen, Germany, and are employed for comparison purposes. Compound B is B-8222, Compound C is B-8002, and Compound D is BF-2370.

The following examples illustrate the invention, and are not intended to be limiting.

Preparation of $MD_xD'_yM$ Fluids

A flask, fitted with a mechanical stirrer and a reflux condenser under a positive pressure of nitrogen, was charged with the desired amounts of hexamethyldisiloxane (MM), octamethyl-cyclotetrasiloxane (cyclic $D_4$), L-31, and sulfuric acid (2%). The mixture was stirred overnight at ambient temperature, then the sulfuric acid puddle was removed and an excess of sodium bicarbonate was added cautiously to neutralize any residual acid. The mixture was treated with decolorizing carbon and then filtered to give the product as a colorless liquid. The range of architectures are shown in Table 1.

TABLE 1

Structures of $MD_xD'_yM$ Fluids
SiH Fluid Study: SiH fluid Structures.

| D | D' | Viscosity (cSt @ 25° C.) | SiH (ccH2/g) | MWt (Est.) | D/ |
|---|---|---|---|---|---|
| 44.5 | 3.1 | 45 | 19 | 3644 | 14. |
| 42.9 | 5 | 45 | 31 | 3644 | 8. |
| 41.3 | 7 | 45 | 43 | 3644 | 5. |
| 48.1 | 3.3 | 50 | 19 | 3932 | 14. |
| 46.4 | 5.4 | 50 | 31 | 3932 | 8. |
| 44.7 | 7.5 | 50 | 43 | 3932 | 6. |
| 67.5 | 4.62 | 78.5 | 19 | 5443 | 14. |
| 65.1 | 7.53 | 78.5 | 31 | 5443 | 8. |
| 63.3 | 9.7 | 78.5 | 40 | 5443 | 6. |
| 62.7 | 10.5 | 78.5 | 43 | 5443 | 6. |
| 62.3 | 10.9 | 78.5 | 45 | 5443 | 5. |

TABLE 1-continued

Structures of $MD_xD'_yM$ Fluids
SiH Fluid Study: SiH fluid Structures.

| D | D' | Viscosity (cSt @ 25° C.) | SiH (ccH2/g) | MWt (Est.) | D/ |
|---|---|---|---|---|---|
| 61.4 | 12.1 | 78.5 | 50 | 5443 | 5. |
| 82.0 | 8.5 | 106 | 28 | 6146 | 9. |
| 110.2 | 12.6 | 160 | 31 | 9093 | 8. |
| 120.2 | 13.7 | 180 | 31 | 9899 | 8. |
| 129.8 | 14.8 | 200 | 31 | 10680 | 8. |
| 139.2 | 15.8 | 220 | 31 | 11440 | 8. |
| 146.6 | 9.9 | 225 | 19 | 11627 | 14. |
| 141.5 | 16.1 | 225 | 31 | 11627 | 8. |
| 136.5 | 22.3 | 225 | 43 | 11627 | 6. |
| 135.7 | 23.4 | 225 | 45 | 11627 | 5. |
| 223.1 | 14.9 | 400 | 19 | 17602 | 15. |
| 215.4 | 24.4 | 400 | 31 | 17602 | 8. |
| 207.8 | 33.8 | 400 | 43 | 17602 | 6. |
| 206.5 | 35.4 | 400 | 45 | 17602 | 5. |

Preparation of $MD_xD''_yM$ Surfactants

A typical preparation proceeded as follows: A flask fitted with a mechanical stirrer, a reflux condenser, and a thermometer (connected to a THERMOWATCH® controller) was charged under positive nitrogen pressure with the desired $MD_xD'_yM$ fluid, blend of polyethers, and solvent (if used). The mixture was heated to about 85° C. and an ethanol solution of hexachloroplatinic acid (15 ppm Pt) was added. An exotherm of several degrees ensued, after which the reaction was allowed to proceed for approximately 40 minutes. At the end of this time an aliquot typically would show only a trace of residual Si-H. Aqueous hydrogen peroxide (200 ppm) was added, the mixture was stirred 30 minutes, any volatile solvents and odor bodies were removed under vacuum, and the resulting copolymer product was cooled to room temperature, optionally neutralized with sodium bicarbonate or tertiary amines (if acidic), and filtered. The resulting product was diluted to 50% with diluent (e.g., DPG or simple polyethers) to yield a low viscosity surfactant for performance evaluation.

The surfactants listed in Table 2 below were prepared using the above general procedure. The surfactants of Table 2 were evaluated in the polyurethane foam formulation ("High Water Test") and the results included in Table 2 or Table 5. Additional preparations using three polyethers are described in Table 3 and foam evaluations of these materials are given in Table 5. Table 5 shows foam performance at several use levels which allows comparison of processing latitude (it is considered desirable that the foam properties change little with changing use level).

TABLE 2

Specifics of Surfactant Syntheses

| No. | Structure | grams Fluid[a] | BAMW[b] | PE#1 | grams PE#1[c] | PE#2[c] | grams PE#2 | High Water Test[d] |
|---|---|---|---|---|---|---|---|---|
| 1 | $MD_{44}D''_{3.1}M$ | 89.5 | 1100 | A | 75.8 | B | 64.7 | V. coarse |
| 2 | $MD_{44}D''_{3.1}M$ | 82.5 | 1250 | A | 90.7 | B | 56.8 | V. coarse |
| 3 | $MD_{44}D''_{3.1}M$ | 76.6 | 1400 | A | 103.4 | B | 50.0 | V. Coarse |
| 4 | $MD_{43}D''_{5.0}M$ | 68.6 | 1100 | A | 87.1 | B | 74.3 | Spongy |
| 5 | $MD_{43}D''_{5.0}M$ | 62.5 | 1250 | A | 103.0 | B | 64.5 | Coarse |
| 6 | $MD_{43}D''_{5.0}M$ | 57.4 | 1400 | A | 116.3 | B | 56.3 | Good (0.8–1.5) |
| 7 | $MD_{41}D''_7M$ | 55.3 | 1100 | A | 94.3 | B | 80.5 | Sponge |
| 8 | $MD_{41}D''_7M$ | 50.0 | 1250 | A | 110.7 | B | 69.3 | Coarse |
| 9 | $MD_{41}D''_7M$ | 45.7 | 1400 | A | 124.2 | B | 60.1 | Good (0.8–1.5) |

TABLE 2-continued

Specifics of Surfactant Syntheses

| No. | Structure | grams Fluid[a] | BAMW[b] | PE#1 | grams PE#1[c] | PE#2[c] | grams PE#2 | High Water Test[d] |
|---|---|---|---|---|---|---|---|---|
| 10 | $MD_{68}D''_{5}M$ | 92.1 | 1100 | A | 74.4 | B | 63.5 | Collapsed |
| 11 | $MD_{68}D''_{5}M$ | 85.0 | 1250 | A | 89.1 | B | 55.8 | Collapsed |
| 12 | $MD_{68}D''_{5}M$ | 79.0 | 1400 | A | 101.8 | B | 49.2 | V. Coarse |
| 13 | $MD_{65}D''_{7.5}M$ | 67.4 | 1100 | A | 87.7 | B | 74.9 | Coarse (1.2–3.5) |
| 14 | $MD_{65}D''_{7.5}M$ | 61.4 | 1250 | A | 103.7 | B | 64.9 | Coarse (1.0–3.0) |
| 15 | $MD_{65}D''_{7.5}M$ | 56.4 | 1400 | A | 117.0 | B | 56.6 | Good (0.6–1.8) |
| 16 | $MD_{63}D''_{11}M$ | 54.2 | 1100 | A | 94.9 | B | 81.0 | Coarse (1.2–2.8) |
| 17 | $MD_{63}D''_{11}M$ | 49.0 | 1250 | A | 111.3 | B | 69.7 | Good (0.8–1.6) |
| 18 | $MD_{63}D''_{11}M$ | 44.7 | 1400 | A | 124.9 | B | 60.4 | V. Good (0.6–1.2) |
| 19 | $MD_{141}D''_{16}M$ | 63.7 | 1100 | A | 89.7 | B | 76.7 | Coarse (1.0–2.2) |
| 20 | $MD_{141}D''_{16}M$ | 57.9 | 1250 | A | 105.8 | B | 66.3 | Coarse (1.0–2.2) |
| 21 | $MD_{141}D''_{16}M$ | 53.1 | 1400 | A | 119.2 | B | 57.7 | Coarse (1.0–2.2) |
| 22 | $MD_{136}D''_{22}M$ | 51.2 | 1100 | A | 96.4 | B | 82.3 | Coarse (1.0–2.2) |
| 23 | $MD_{136}D''_{22}M$ | 46.3 | 1250 | A | 113.0 | B | 70.8 | Sl. Coarse (0.8–1.8) |
| 24 | $MD_{136}D''_{22}M$ | 42.2 | 1400 | A | 126.6 | B | 61.2 | Sl. Coarse (0.8–1.8) |
| 25 | $MD_{223}D''_{15}M$ | 88.3 | 1100 | A | 76.5 | B | 65.3 | Collapsed |
| 26 | $MD_{223}D''_{15}M$ | 81.4 | 1250 | A | 91.4 | B | 57.2 | Collapsed |
| 27 | $MD_{223}D''_{15}M$ | 75.4 | 1400 | A | 104.2 | B | 50.4 | Collapsed |
| 28 | $MD_{215}D''_{24}M$ | 65.5 | 1100 | A | 88.7 | B | 75.7 | Collapsed |
| 29 | $MD_{215}D''_{24}M$ | 59.6 | 1250 | A | 104.8 | B | 65.6 | Coarse (0.8–2.0) |
| 30 | $MD_{207}D''_{34}M$ | 50.9 | 1100 | A | 96.6 | B | 82.5 | Coarse (1–2) |
| 31 | $MD_{207}D''_{34}M$ | 46.0 | 1250 | A | 113.2 | B | 70.9 | Coarse (0.8–2) |
| 32 | $MD_{207}D''_{34}M$ | 41.9 | 1400 | A | 126.8 | B | 61.3 | S. Coarse (1–1.8) |
| 33 | $MD_{62}D''_{7}M''$ | 52.5 | 1265 | A | 112.0 | B | 65.5 | —[e] |
| 34 | $MD_{62}D''_{7}M''$ | 66.8 | 1265 | A | 102.4 | B | 60.8 | —[e] |
| 35 | $MD_{66}D''_{8.5}M$ | 65.6 | 1300 | A | 105.2 | B | 59.2 | —[e] |
| 36 | $MD_{82}D''_{8.5}M$ | 29.5 | 1185 | A' | 41.2 | B | 29.3 | Moderate |
| 37 | $MD_{82}D''_{8.5}M$ | 28.1 | 1265 | A' | 44.7 | B | 27.2 | Good |
| 38 | $MD_{82}D''_{8.5}M$ | 26.1 | 1400 | A' | 49.8 | B | 24.1 | Good |

Footnotes for Table 2:
[a]Silane fluid of structure $MD_xD'_yM$ (see Table 1 for details) or $M'D_xD'_yM'$.
[b]Blend average molecular weight of the polyether blend.
[c]Components of polyether blend used in synthesis of surfactant. Symbolism: initial number followed by H indicates nominal % of ethylene oxide residues in a polyether based on ethylene oxide and propylene oxide; letter A indicates polyether is allyl- started; numbers following capital letter and preceding "mw" indicate nominal molecular weight of the allyl polyether; letters OH, OAc, and OMe following "mw" indicate uncapped, acetoxy-capped, and methoxy-capped, respectively; PEG stands for polyethylene glycol; PPG stands for polypropylene glycol. Definition of polyether codes: A) = 40HA4000mw-OAc A') = 40HA4000mw-OH B) = 100HA500mw-OAc
[d]Foam test formulation given in Table 4 with surfactant use level of 2.08 pphp. Results given as qualitative evaluation. Values in parentheses are cell size range where available; the smaller the values, the better. Extremely coarse or spongy foams were not examined for cell size.
[e]See Table 5 for foam performance results.

TABLE 3

Specifics of Surfactant Syntheses

| No. | Structure | grams Fluid[a] | PE#1 | grams PE#1[c] | PE#2[c] | grams PE#2 | PE#3 | grams PE#3 | BAMW PE 1 + 2 | BAMW All PE |
|---|---|---|---|---|---|---|---|---|---|---|
| 40 | $MD_{41}D''_{7}M$ | 42.7 | A | 48.8 | C | 92.8 | B | 26.3 | 1900 | 1326 |
| 41 | $MD_{65}D''_{7.5}M$ | 56.0 | A | 48.8 | C | 92.8 | B | 26.3 | 1900 | 1326 |
| 42 | $MD_{65}D''_{7.5}M$ | 48.5 | A | 89.3 | C | 65.2 | B | 22.7 | 2300 | 1594 |
| 43 | $MD_{147}D''_{10}M$ | 90.3 | A | 48.7 | C | 93.0 | B | 26.3 | 1900 | 1325 |
| 44 | $MD_{142}D''_{16}M$ | 51.8 | A | 48.7 | C | 93.0 | B | 26.3 | 1900 | 1325 |
| 45 | $MD_{82}D''_{8.5}M$ | 61.0 | A | 49.8 | C | 92.8 | D | 26.3 | 1900 | 1206 |
| 46 | $MD_{82}D''_{8.5}M$ | 52.7 | A | 89.3 | C | 65.2 | D | 22.8 | 2300 | 1444 |
| 47 | $MD_{82}D''_{8.5}M$ | 61.0 | A | 49.8 | C | 92.8 | E | 26.3 | 1900 | 1430 |
| 48 | $MD_{82}D''_{8.5}M$ | 52.7 | A | 89.3 | C | 65.2 | E | 22.8 | 2300 | 1708 |
| 49 | $MD_{82}D''_{8.5}M$ | 44.1 | A | 87.9 | F | 74.7 | B | 23.3 | 3000 | 1755 |
| 50 | $MD_{82}D''_{8.5}M$ | 42.4 | A | 90.3 | F | 76.7 | B | 20.6 | 3000 | 1837 |
| 51 | $MD_{82}D''_{8.5}M$ | 45.9 | A | 66.2 | F | 93.6 | B | 24.3 | 2750 | 1644 |
| 52 | $MD_{82}D''_{8.5}M$ | 44.2 | A | 68.1 | F | 96.3 | B | 21.4 | 2750 | 1721 |

TABLE 3-continued

Specifics of Surfactant Syntheses

| | | | Polyethers | | | | | | | |
|---|---|---|---|---|---|---|---|---|---|---|
| No. | Structure | grams Fluid[a] | PE#1 | grams PE#1[c] | PE#2[c] | grams PE#2 | PE#3 | grams PE#3 | BAMW PE 1 + 2 | BAMW All PE |
| 53 | $MD_{82}D''_{8.5}M$ | 47.9 | A | 42.7 | F | 114.1 | B | 25.3 | 2500 | 1539 |
| 54 | $MD_{82}D''_{8.5}M$ | 46.1 | A | 44.0 | F | 117.5 | B | 22.4 | 2500 | 1605 |
| 55 | $MD_{82}D''_{8.5}M$ | 44.7 | A | 45.0 | F | 120.2 | B | 20.0 | 2500 | 1663 |
| 56 | $MD_{82}D''_{8.5}M$ | 53.7 | A | 90.6 | C | 59.6 | B | 26.1 | 2500 | 1539 |
| 57 | $MD_{82}D''_{8.5}M$ | 52.3 | A | 93.0 | C | 61.2 | B | 23.4 | 2500 | 1602 |
| 58 | $MD_{82}D''_{8.5}M$ | 59.1 | A | 65.4 | C | 76.9 | B | 28.6 | 2200 | 1369 |
| 59 | $MD_{82}D''_{8.5}M$ | 57.7 | A | 67.3 | C | 79.2 | B | 25.8 | 2200 | 1421 |
| 60 | $MD_{82}D''_{8.5}M$ | 56.5 | A | 68.9 | C | 81.1 | B | 23.5 | 2200 | 1467 |
| 61 | $MD_{82}D''_{8.5}M$ | 48.0 | A | 42.5 | G | 102.2 | B | 37.3 | 3300 | 1526 |
| 62 | $MD_{82}D''_{8.5}M$ | 41.5 | A | 47.2 | G | 113.6 | B | 27.6 | 3300 | 1797 |
| 63 | $MD_{82}D''_{8.5}M$ | 37.7 | A | 50.0 | G | 120.4 | B | 21.9 | 3300 | 1994 |
| 64 | $MD_{82}D''_{8.5}M$ | 51.8 | A | 87.9 | C | 64.1 | H | 26.5 | 2300 | 1516 |
| 65 | $MD_{82}D''_{8.5}M$ | 56.4 | I | 71.0 | J | 78.0 | K | 24.4 | 2100 | 1463 |
| 66 | $MD_{82}D''_{8.5}M$ | 62.4 | I | 48.35 | J | 90.04 | K | 29.19 | 1900 | 1284 |
| 67 | $MD_{82}D''_{8.5}M$ | 54.14 | I | 87.02 | J | 63.52 | K | 25.32 | 2300 | 1533 |
| 68 | $MD_{82}D''_{8.5}M$ | 61.0 | L | 49.8 | M | 92.8 | N | 26.3 | 1900 | 1331 |

Footnotes for Table 3.
[a]Silane fluid of structure $MD_xD'_yM$ (see Table 1 for details) or $M'D_xD'_yM'$.
[b]Components of polyether blend Used in synthesis of surfactant. See footnote c) in Table 2 for definitions. Additional definitions are given below. C) = 40HA1500mw-OAc D) = 100HA400mw-OAc E) = 100HA600mw-OAc F) = 40HA2000mw-OAc G) = 40HA3000mw-OAc H) = 40HA500mw-OAc I) = 40HA4000mw-OMe J) = 40HA1500mw-OMe K) = 100HA500mw-OMe L) = 40HA4000mw-OH M) = 40HA1500mw-OH N) = 100HA500mw-OH

TABLE 4

Polyurethane Foam Test Formulation A

| Material | pphp (wt.) |
|---|---|
| ARCOL ® Polyol 16-56 | 100 |
| Distilled water | 6.5 |
| NIAX ® Catalyst C-183 | 0.14 |
| Methylene chloride | NONE |
| Stannous octoate | 0.20 |
| Toluene diisocyanate(TDI)[a] | 71.56 |
| Surfactant | Varied |

Footnote for Table 4:
[a]The TDI was employed at a level of 100% of the stoichiometric amount.

Procedure for Preparation and Testing of Polyurethane Foams

The temperature of the laboratory, the polyol and the TDI were noted. A 32 ounce paper cup was charged with ARCOL® Polyol 16-56 (400 g), the surfactant to be evaluated, amine/water premix (containing 26.0 g of water and 0.56 g of NIAX® catalyst C-183). A brass mixing baffle with four equally spaced 0.5 inch wide vertical baffles was inserted into the cup, and the mixture was stirred for 60 seconds at 2400 rpm using a drill press with a marine blade. After 15 seconds stannous octoate (0.80g, 0.64 ml) was added to the reaction mixture. A timer was started and the mixture was stirred for 10 seconds before adding 80/20 toluene diisocyanate (286.2 g, 100% of the stoichiometric amount) with continuous stirring for an additional five seconds. The stirrer was then stopped and the reaction mixture was dumped into a 14"×14"×6" cardboard cake box. The cup was kept inverted over the bucket for a total of ten seconds. As the foam began to rise, the maximum height of the foam at blowoff, the amount of top collapse after one minute, and the rise time were recorded. The foam was placed in an oven at 120° C. for about ten minutes, and then was allowed to cool to room temperature overnight. The height of the foam was measured in cm, then the foam was cut open using a band saw and samples were taken for evaluation. 1.5 inches was removed from all sides of the 14"×14"×6" foam: the rounded "top" section was also removed, then a ½ inch section was cut from the top of the remaining foam section. On the ½ inch top section, cell size and , optionally, the number of ⅛" (or larger) size holes in a 4"4" square area was measured. Airflow/Porosity (Breathability) through the foam was determined using a Nopco breathability apparatus (a similar machine is commercially available from AMSCOR of Angleton, TX as 1377 FPI Foam Porosity Instrument) with an adjusted back pressure of 0.5 inches of water and air flow read in standard cubic feet per minute. This device is described in the article by Jones and Fesman, J. Cellular Plastics, 1, 3–19 (1965), and the relevant portions of this reference are hereby incorporated by reference.

Test results from experimental foams made according to Test Formulation A are presented in Table 5 below.

TABLE 5

Foam Test Results, Test Formulation A

| Surfactant Number | Amount (pphp)[a] | Av. Cell sizes[b] | Breath- ability[c] | Height of Rise. cm[d] | Comment[j] |
|---|---|---|---|---|---|
| UCC&P I[e,f]* | 0.8[i] | 1–3 | 152 | 22.3 | V. Coarse |
| UCC&P II[e,f]* | 0.8[i] | 1–1.5 | 195 | 26.8 | Center split |
| UCC&P III[e,g]* | 1.0[i] | 0.6–1 | 176 | 24.0 | Center split |
| UCC&P IV[e,g]* | 1.2[i] | 0.8–1 | 163 | 23.6 | Hard blow |
| UCC&P V[e,g]* | 1.1[i] | 0.6–1 | 155 | 24.0 | Center split |
| UCC&P VI[e,g]* | 1.2[i] | 0.8–1.2 | 112 | 23.6 | Center split |
| Compound A* | 0.8[i] | 2.5–6 | 58 | 21.9 | Extremely Coarse |
| Compound B* | 1.1[i] | 0.8–1.5 | 157 | 27.0 | Center split |
| Compound C* | 1.2[i] | — | Collapsed | — | |
| Compound D* | 1.2[i] | 0.8–1.0 | 164 | 24.0 | Center split |
| 33 | 3.2 | 0.3–1.5 | 122 | 26.2 | |
| 33 | 2.1 | 0.2–1.2 | 60 | 25.2 | |
| 34 | 3.1 | 0.2–1.0 | 97 | 25.6 | |
| 34 | 2.1 | 1–2.2 | 2 | 24.1 | V. Coarse; low AF |
| 35 | 3.1 | 0.3–1.0 | 110 | 25.8 | Good |
| 35 | 2.1 | 0.8–1.8 | 5.2 | 25.2 | Coarse; low AF |
| 40 | 3.1 | 0.3–1.3 | 116 | 23.5 | |
| 40 | 2.1 | 0.3–1.6 | 146 | 23.9 | |
| 41 | 3.1 | 0.3–1.1 | 117 | 24.7 | |
| 41 | 2.1 | 0.2–0.9 | 106 | 24.7 | |
| 42 | 3.1 | 0.3–0.9 | 120 | 25.4 | |
| 42 | 2.1 | 0.3–0.9 | 152 | 25.0 | |
| 43 | 3.1 | 0.2–0.8 | 71 | 24.1 | Hard blow |
| 43 | 2.1 | 0.2–1.0 | 111 | 23.7 | |
| 44 | 3.1 | 0.2–1.0 | 93 | 24.5 | |
| 44 | 2.1 | 0.2–0.9 | 132 | 24.3 | |
| 45 | 3.1 | 0.2–1.0 | 148 | 23.9 | |
| 45 | 2.1 | 0.3–0.9 | 143 | 24.1 | |
| 46 | 3.1 | 0.2–0.8 | 130 | 24.3 | |
| 46 | 2.1 | 0.2–1.0 | 143 | 24.3 | |
| 47 | 3.1 | 0.2–0.7 | 13 | 28.1 | Low AF, high rise |
| 47 | 2.1 | 0.2–1.0 | 138 | 24.8 | Zero back collapse |
| 48 | 3.1 | 0.2–1.2 | 96 | 25.2 | |
| 48 | 2.1 | 0.2–1.4 | 104 | 25.2 | |
| 49 | 3.1 | 0.3–0.9 | 69 | 25.0 | |
| 49 | 2.1 | 0.3–1.4 | 83 | 25.0 | |
| 50 | 3.1 | 0.3–1.2 | 96 | 25.6 | |
| 50 | 2.1 | 0.3–1.2 | 73 | 25.6 | |
| 51 | 3.1 | 0.2–1.0 | 99 | 25.4 | |
| 51 | 2.1 | 0.3–1.0 | 104 | 25.4 | |
| 52 | 3.1 | 0.4–1.2 | 99 | 25.0 | |
| 52 | 2.1 | 0.3–1.0 | 92 | 25.8 | |
| 53 | 3.1 | 0.2–0.9 | 129 | 25.2 | |
| 53 | 2.1 | 0.2–0.9 | 109 | 25.8 | |
| 54 | 3.1 | 0.2–0.8 | 126 | 26.0 | |
| 54 | 2.1 | 0.2–1.0 | 119 | 26.0 | |
| 55 | 3.1 | 0.3–1.2 | 141 | 26.6 | |
| 55 | 2.1 | 0.3–1.0 | 97.2 | 26.0 | |
| 56 | 3.1 | 0.2–1.0 | 101 | 25.8 | |
| 56 | 2.1 | 0.2–1.0 | 126 | 25.8 | |
| 57 | 3.1 | 0.2–1.2 | 108 | 26.4 | |
| 57 | 2.1 | 0.2–1.2 | 110 | 26.4 | |
| 58 | 3.1 | 0.2–0.8 | 147 | 26.4 | |
| 58 | 2.1 | 0.2–1.0 | 150 | 25.8 | |
| 59 | 3.1 | 0.3–1.2 | 128 | 24.8 | |
| 59 | 2.1 | 0.3–1.0 | 204 | 25.6 | Unusually high AF |
| 60 | 3.1 | 0.3–1.0 | 149 | 25.6 | |
| 60 | 2.1 | 0.3–1.1 | 168 | 25.2 | |
| 61 | 3.1 | 0.2–1.2 | 117 | 25.6 | |
| 61 | 2.1 | 0.4–1.5 | 117 | 25.2 | |
| 62 | 3.1 | 0.3–1.2 | 104 | 26.0 | |
| 62 | 2.1 | 0.2–1.2 | 83 | 25.8 | |
| 63 | 3.1 | 0.2–1.0 | 100 | 26.3 | |
| 63 | 2.1 | 0.4–1.3 | 96 | 26.3 | |
| 64 | 3.1 | 0.2–1.0 | 144 | 23.9 | |
| 64 | 2.1 | 0.3–1.0 | 134 | 24.3 | |
| 65 | 3.1 | 0.3–0.7 | 118 | 24.7 | |
| 65 | 2.1 | 0.3–0.9 | 102 | 24.7 | |
| 66 | 3.1 | NR | 98 | 24.0 | Good blow |
| 67 | 3.1 | NR | 84 | 21.9 | Modest rise |
| 67 | 2.1 | NR | 78 | 24.2 | |
| 68 | 3.1 | 0.9–1.2 | 5.9 | 24.8 | Sl. coarse; v. low AF |
| 68 | 2.1 | 1.2–2.0 | 1.3 | 25.2 | Coarse, voids; v. low AF |

TABLE 5-continued

Foam Test Results, Test Formulation A

| Surfactant Number | Amount (pphp)[a] | Av. Cell sizes[b] | Breath-ability[c] | Height of Rise. cm[d] | Comment[j] |
|---|---|---|---|---|---|

Footnotes for Table 5: (*Denotes materials not covered in present invention, but included for comparative basis)
[a]Amount of surfactant is expressed in parts per hundred parts of polyol. Copolymer concentration is ½ this level (@50% dilution) unless otherwise indicated.
[b]Average range of cell sizes (in mm) by examining under magnifying glass.
[c]Breathability measured as air flow (AF) in standard cubic feet per minute, through a middle-cut sample.
[d]Height of foam rise in cm one minute after blow-off.
[e]These are OSi Specialties Inc. surfactants made according to the teachings of the following patents: f) USP 5145879. g) USP 3980688 h) USP 4857583 Materials used as supplied without further dilution.
[i]Products from Air Products and Th. Goldschmidt A. G. Materials used as supplied without further dilution..
[j]Center splits are indications of severe stability problems. Hard blows often also indicate stability or other related problems. The presence of either of these are regarded as very bad.

Table 2 reveals that as long as the D/(D"+M") ratio is less than 10, good performance is achieved even with silicone backbones containing over 200 siloxy units (precise fine tuning of performance is achieved by adjusting the BAMW and oxide contents of the polyethers—see below). Copolymers with D/(D"+M") ratios greater than 10 clearly showed inferior foam performance (Table 2). It can be seen from Table 5 that the surfactants of the present invention afford good to excellent performance (small cell size, high rise) with generally flat breathability profiles as a function of surfactant concentrations. Examples 36–38 (Table 2) show that when the low molecular weight polyether is capped, the high molecular weight polyether need not be capped which eliminates one step in the manufacture of the surfactant.

Additional examples of suffactants of the invention were prepared as shown in Table 6. These materials were prepared with polyethers with differing ethylene oxide (EO) content in the low molecular weight polyethers. The results of the High Water Formulation Foam test is also given in Table 6. Surfactants 69–71 clearly reveal that the EO content of the low molecular weight polyether needs to exceed 30% EO to achieve good performance. For example, the Surfactant 64 composition successfully employed a polyether composed of 40% ethylene oxide moieties. All other materials exhibited excellent rise and breathabilities unless otherwise noted.

TABLE 6

Ingredients for Surfactant Syntheses

| | | | Polyethers | | | | | |
|---|---|---|---|---|---|---|---|---|
| No. | Structure | grams Fluid[a] | BAMW[b] | PE#1 | grams PE#1[c] | PE#2[c] | grams PE#2 | High Water Test[d] |
| 69* | $MD_{82}D''_{8.5}M$ | 68.0 | 1100 | A | 78.6 | O | 83.4 | Collapsed |
| 70* | $MD_{82}D''_{8.5}M$ | 62.4 | 1250 | A | 94.6 | O | 73.0 | Collapsed |
| 71* | $MD_{82}D''_{8.5}M$ | 57.8 | 1400 | A | 108.1 | O | 64.1 | Collapsed |
| 72 | $MD_{82}D''_{8.5}M$ | 64.4 | 1250 | A | 98.4 | P | 67.2 | Good (0.6–1.2) |
| 73 | $MD_{82}D''_{8.5}M$ | 59.3 | 1400 | A | 111.9 | P | 58.8 | Sl. Coarse (0.6–1.5) |
| 74 | $MD_{82}D''_{8.5}M$ | 70.1 | 1100 | A | 83.4 | Q | 77.9 | V. Coarse (1–4.5) |
| 75 | $MD_{82}D''_{8.5}M$ | 64.2 | 1250 | A | 98.0 | Q | 67.9 | Good (0.6–1.2) |
| 76 | $MD_{82}D''_{8.5}M$ | 59.1 | 1400 | A | 111.5 | Q | 59.4 | Sl. Coarse (0.6–1.5) |
| 77 | $MD_{82}D''_{8.5}M$ | 71.5 | 1100 | A | 85.5 | R | 73.0 | V. Coarse (1.5–9)[e] |
| 78 | $MD_{82}D''_{8.5}M$ | 65.2 | 1250 | A | 101.3 | R | 63.5 | Coarse (1–2.5)[e] |
| 79 | $MD_{82}D''_{8.5}M$ | 60.0 | 1400 | A | 114.6 | R | 55.4 | Coarse (1–2) |
| 80 | $MD_{82}D''_{8.5}M$ | 63.3 | 1100 | A | 74.9 | S | 91.8 | Coarse (1–2) |
| 81 | $MD_{82}D''_{8.5}M$ | 58.7 | 1250 | A | 90.3 | S | 81.0 | Coarse (1–1.8) |
| 82 | $MD_{82}D''_{8.5}M$ | 54.7 | 1400 | A | 103.7 | S | 71.7 | Sl. Coarse (0.8–1.5) |

Footnotes for Table 6: (*Denotes materials not covered in present invention, but included for comparative purposes)
[a]Silane fluid of structure $MD_xD'_yM$ (see Table 1 for details) or $M'D_xD'_yM'$.
[b]Blend average molecular weight of the polyether blend.
[c]Components of polyether blend used in synthesis of surfactant. See footnote c) in Table 2 for definitions. Additional definitions are given below. O) 30HA500mw-OAc P) 80HA500mw-OAc Q) 90HA500mw-OAc R) 100HA500mw S) 100HA500mw capped with 10% w/w PO followed by acetoxy capping. Roughly the equivalent to a block feed 90HA550mw-OAc.
[d]Foam test formulation given in Table 4 with surfactant use level of 2.08 pphp (@50% dilution). Results given as a qualitative evaluation. Values in parentheses are cell size range (in mm); the smaller the values, the better. Extremely coarse or spongy foams were not examined for cell size.
[e]Samples also exhibited very low breathabilities (<10 sccm).

Additional examples of surfactants of the invention were prepared as shown in Table 7. These materials were prepared with polyethers with differing EO content or molecular weight of the high molecular weight polyethers. The results of the High Water Formulation Foam test is also given in Table 8. Comparing surfactants 83–88 with surfactants 89–92 clearly reveal the importance of incorporating at least some very high (>3000) molecular weight polyether in the copolymer structure. Polyethers below 4000 MWt can be used in blends in conjunction with very high molecular weight polyethers to achieve acceptable rise and structure performance; such blends often exhibit desirable features (see Table 5). Note that generally flat breathability performance was observed and the breathability performance generally inversely correlates with the BAMW of the copolymer (except where poor structures were observed which in itself generally results in very low breathabilities).

ing to the present invention and demonstrate the advantage of diluting the material. Materials B and C had unacceptable performance before dilution but improved dramatically upon dilution. In fact, without dilution, Materials B and C would have been (and were) judged unsuitable in the prior art. Thus the range of suitable copolymer architectures can

TABLE 7

Specifics of Surfactant Syntheses

| | | | Polyethers | | | |
|---|---|---|---|---|---|---|
| No. | Structure | grams Fluid[a] | BAMW[b] | PE#1 | grams PE#1[c] | PE#2[c] | grams PE#2 |
| 83 | $MD_{82}D'_{8.5}M$ | 73.8 | 1100 | T | 81.3 | B | 74.9 |
| 84 | $MD_{82}D''_{8.5}M$ | 67.8 | 1250 | T | 96.9 | B | 65.4 |
| 85 | $MD_{82}D''_{8.5}M$ | 62.7 | 1400 | T | 110.1 | B | 57.3 |
| 86 | $MD_{82}D''_{8.5}M$ | 53.3 | 1100 | U | 122.2 | B | 54.6 |
| 87 | $MD_{82}D''_{8.5}M$ | 46.4 | 1250 | U | 138.2 | B | 45.4 |
| 88 | $MD_{82}D''_{8.5}M$ | 41.2 | 1400 | U | 150.6 | B | 38.2 |
| 89 | $MD_{82}D''_{8.5}M$ | 73.0 | 1100 | V | 93.3 | B | 63.7 |
| 90 | $MD_{82}D''_{8.5}M$ | 66.9 | 1250 | V | 111.0 | B | 52.2 |
| 91 | $MD_{82}D''_{8.5}M$ | 61.7 | 1400 | V | 125.9 | B | 42.4 |
| 92 | $MD_{82}D''_{8.5}M$ | 63.0 | 1400 | W | 112.9 | B | 54.1 |

Footnotes for Table 7
[a]Silane fluid of structure $MD_xD'_yM$ (see Table 1 for details).
[b]Blend average molecular weight of the polyether blend.
[c]Components of polyether blend used in synthesis of surfactant. See footnote c) in Table 2 for definitions. Additional definitions are given below. T) = 20HA4000mw-OAc U) = 30HA4000mw-OAc V) = 40HA2000mw-OAc W) 40HA3000mw-OAc

TABLE 8

Foam Test Results, Test Formulation A

| Surfactant Number | Amount (php)[a] | Av. Cell sizes[b] | Breathability[c] | Height of Rise. cm[d] | Comment |
|---|---|---|---|---|---|
| 83 | 3.1 | 0.7–2 | 122 | 23.7 | Coarse |
| 83 | 2.1 | 1.9–4 | 3 | 25.2 | Extremely coarse; low AF |
| 84 | 3.1 | 0.8–1.6 | 112 | 23.5 | Nice blow |
| 84 | 2.1 | 0.9–1.8 | 128 | 23.7 | Sl. Coarse |
| 85 | 3.1 | 0.7–1.3 | 123 | 25.8 | |
| 85 | 2.1 | 0.8–1.4 | 126 | 25.8 | Hard blow |
| 86 | 3.1 | 0.8–1.5 | 108 | 26.1 | |
| 86 | 2.1 | 1.2–2 | 91 | 25.2 | Coarse |
| 87 | 3.1 | 0.7–1.6 | 59 | 26.3 | |
| 87 | 2.1 | 1–1.7 | 48 | 25.8 | Sl. Coarse |
| 88 | 3.1 | 0.9–1.3 | 28 | 26.3 | AF slightly low |
| 88 | 2.1 | 0.9–1.6 | 22 | 26.3 | AF slightly low |
| 89 | 3.1 | 1.5–6 | 9.6 | 25.2 | Extremely coarse; low AF |
| 90 | 3.1 | 2–4 | 6 | 24.8 | Extremely coarse; low AF |
| 91 | 3.1 | 1.4–3 | 9 | 26.1 | Extremely coarse; low AF |
| 92 | 3.1 | 2–6 | 2 | 23.7 | Extremely coarse; low AF |

Footnotes for Table 8:
[a]Amount of surfactant is expressed in parts per hundred parts of polyol. Copolymer concentration is ½ this level (@50% dilution) unless otherwise indicated.
[b]Average range of cell sizes (in mm) by examining under magnifying glass.
[c]Breathability measured as air flow (AF) in standard cubic feet per minute, through a middle-cut sample.
[d]Height of foam rise in cm one minute after blow-off and normalized to 25° C.

Comparison of Undiluted And Diluted Surfactants

To demonstrate the effect of dilution, a representative material was prepared as described in U.S. Pat. No. 5,145,879 and the viscosities and foam data were obtained before and after dilution (see Material A in the table below). In this particular set of experiments, Material A had marginal performance before dilution, but dramatic improvement was observed upon dilution. Materials B and C are made accordbe extended up to D+D'≈200 (the limits observed in most surfactants in use in flexible foams) simply by insuring the viscosity is sufficiently low enough to allow rapid and thorough dispersion in the foam matrix. This broader range allows more flexibility to customize architecture to meet performance needs.

| Description | Viscosity (@25° C.) | Diluted Viscosity (@25° C.) | Foam Performance (Before dilution) | Foam Performance* (After Dilution) |
|---|---|---|---|---|
| A $MD_{76}D'_{7.5}M$ with APEG550-Ac & 40HA4000-Ac (BAMW = 1800) | 3712 | 824 | Low but flat Airflow | Good |
| B $MD_{207}D'_{34}M$ With APEG550-Ac & 40HA4000-Ac (BAMW = 1400) | 5329 | 848 | Extremely Low Airflow | Good |
| C $MD_{136}D'_{22}M$ with APEG550-Ac & 40HA4000-Ac (BAMW = 1100) | 2232 | 548 | Extremely Steep Airflow | Good |

*Diluted samples were mixed with equal volume of a low viscosity polyether (viscosity: 93 cP @ 25° C.) and were evaluated at the same delivered copolymer level as in the evaluations of the undiluted materials.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A method of manufacturing polyurethane foam comprising:
1) preparing a mixture comprising:
   (a) a siloxane-oxyalkylene copolymer having the general formula $M''D_xD''_yM''$ wherein:

M" represents $(CH_3)_3SiO_{1/2}$ or $R(CH_3)_2SiO_{1/2}$;

D represents $(CH_3)_2SiO_{2/2}$;

D" represents $(CH_3)(R)SiO_{2/2}$;

x is 81–220, y is 8–40, and x/y<10;

R is a polyether-containing substituent derived from a blend of $C_nH_{2n}$-started polyethers selected from the following two groups such that the overall average molecular mass of the polyethers in the surfactant are in the range 1100–1800:

(i) —$C_nH_{2n}O(C_2H_4O)_a(C_3H_6O)_bR''$ moieties having a blend average molecular mass in the range 2000–6000, and wherein:

at least one polyether of type (i) has a molecular weight above 3000;

n is 3–10:

a is a number such that ethylene oxide residues constitute greater than or equal to 30%, but less than or equal to 50%, by weight of the alkylene oxide residues of the polyether;

b is a number such that propylene oxide residues constitute less than or equal to 70%, but greater than 50% by weight, of the alkylene oxide residues of the polyether;

R" represents —H, an alkyl group of 1–4 carbon atoms, —C(O)R''', —C(O)OR''' or —C(O)NHR'''; and R''' represents mono-functional alkyl or aryl groups; and (ii) —$C_nH_{2n}O(C_2H_4O)_{a'}(C_3H_6O)_{b'}R''$ moieties having average molecular masses in the range 300–750, and wherein:

n' is 3–10:

a' is 30 to a number such that ethylene oxide residues constitute 30% to 100% by weight of the alkylene oxide residues of the polyether; and b' is 0 to a number such that propylene oxide residues constitute less than or equal to 70% by weight of the alkylene oxide residues of the polyether; and R" is as defined above; and (b) a diluent in an amount sufficient to reduce the viscosity of the mixture to less than 3,000 cP;
2) preparing a mixture comprising:
   (a) a polyether polyol containing an average of more than two hydroxyl groups per molecule:
   (b) an organic diisocyanate;
   (c) at least one catalyst for production of polyurethane foam;
   (d) water;
   (e) the mixture made in step (1); and
   (f) optionally, reduced or no blowing agent;
2) allowing the mixture made in step (2) to foam; and
3) curing the foamed composition.

2. A method according to claim 1 wherein the siloxane-oxyalkylene copolymer surfactant's polyethers selected from the first group are $C_3H_6O(C_2H_4O)_a(C_3H_6O)_bR''$ moieties containing approximately 40% by weight of ethylene oxide residues.

3. A method according to claim 1 wherein the polyether moieties of the siloxane-oxyalkylene copolymer surfactant have average molecular masses greater than 3500.

4. A method according to claim 1 wherein in the siloxane-oxyalkylene copolymer surfactant R" is selected from the group consisting of —$C(O)CH_3$ or —$CH_3$.

5. A method according to claim 1 wherein the polyethers of the siloxane-oxyalkylene copolymer surfactant are selected from the second group of polyethers and are $C_3H_6O(C_2H_4O)_a(C_3H_6O)_bR''$ moieties containing less than 20 weight percent propylene oxide residues.

6. A method according to claim 5 wherein the polyethers of the siloxane-oxyalkylene copolymer surfactant are comprised of approximately 100% by weight of ethylene oxide residues, and has an average molecular mass in the range 300–750 and R" is —$C(O)CH_3$ or $CH_3$.

7. A method according to claim 1 wherein the siloxane-oxyalkylene copolymer surfactant's polyether moiety of the second group of polyethers is composed of approximately 40% by weight of ethylene oxide residues, and has an average molecular mass in the range 400–600 and R" is —$C(O)CH_3$ or $CH_3$.

8. A method according to claim 1 wherein in the siloxane-oxyalkylene copolymer surfactant the R" of the group (2)(ii) $C_3H_6O(C_2H_4O)_a(C_3H_6O)_bR''$ moieties is acetate and R" of the group (1)(i) $C_3H_6O(C_2H_4O)_a(C_3H_6O)_bR''$ moieties is hydrogen.

9. A process according to claim 1 wherein the mixture of step (2) additionally comprises an auxiliary blowing agent.

* * * * *